March 13, 1934.  A. F. MALLICK  1,950,897
BOILER ALARM GAUGE
Filed Dec. 28, 1929   3 Sheets-Sheet 2
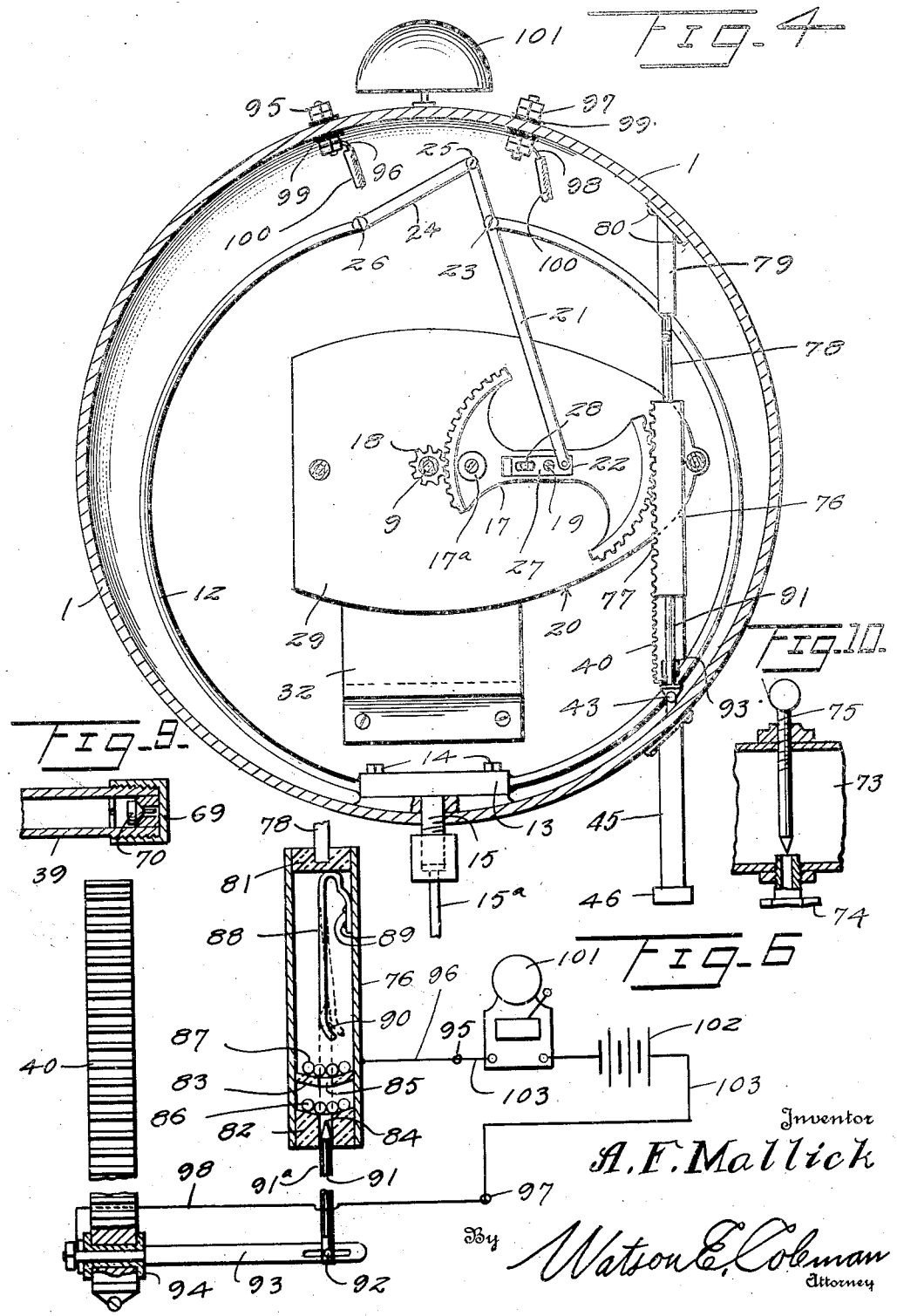

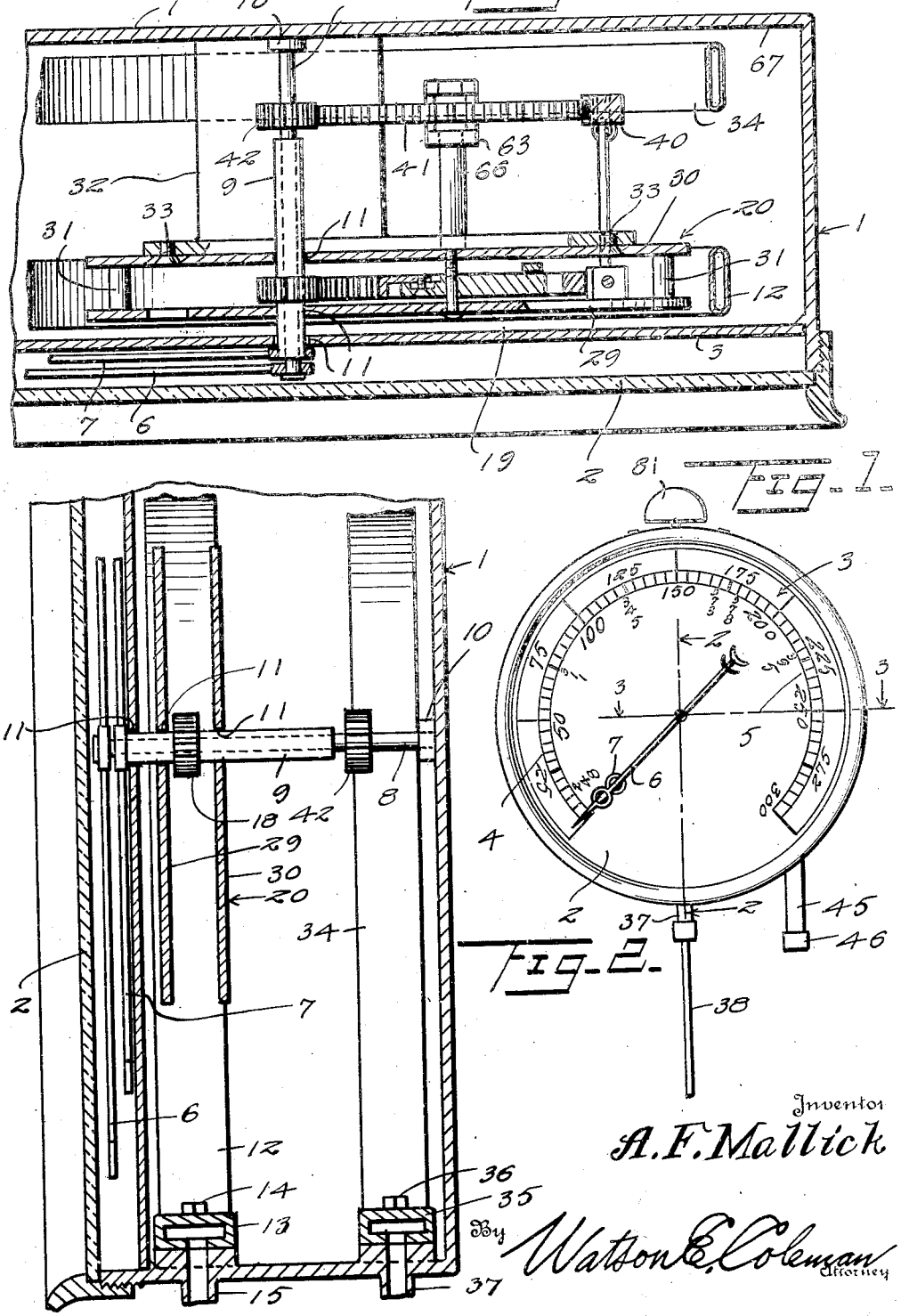

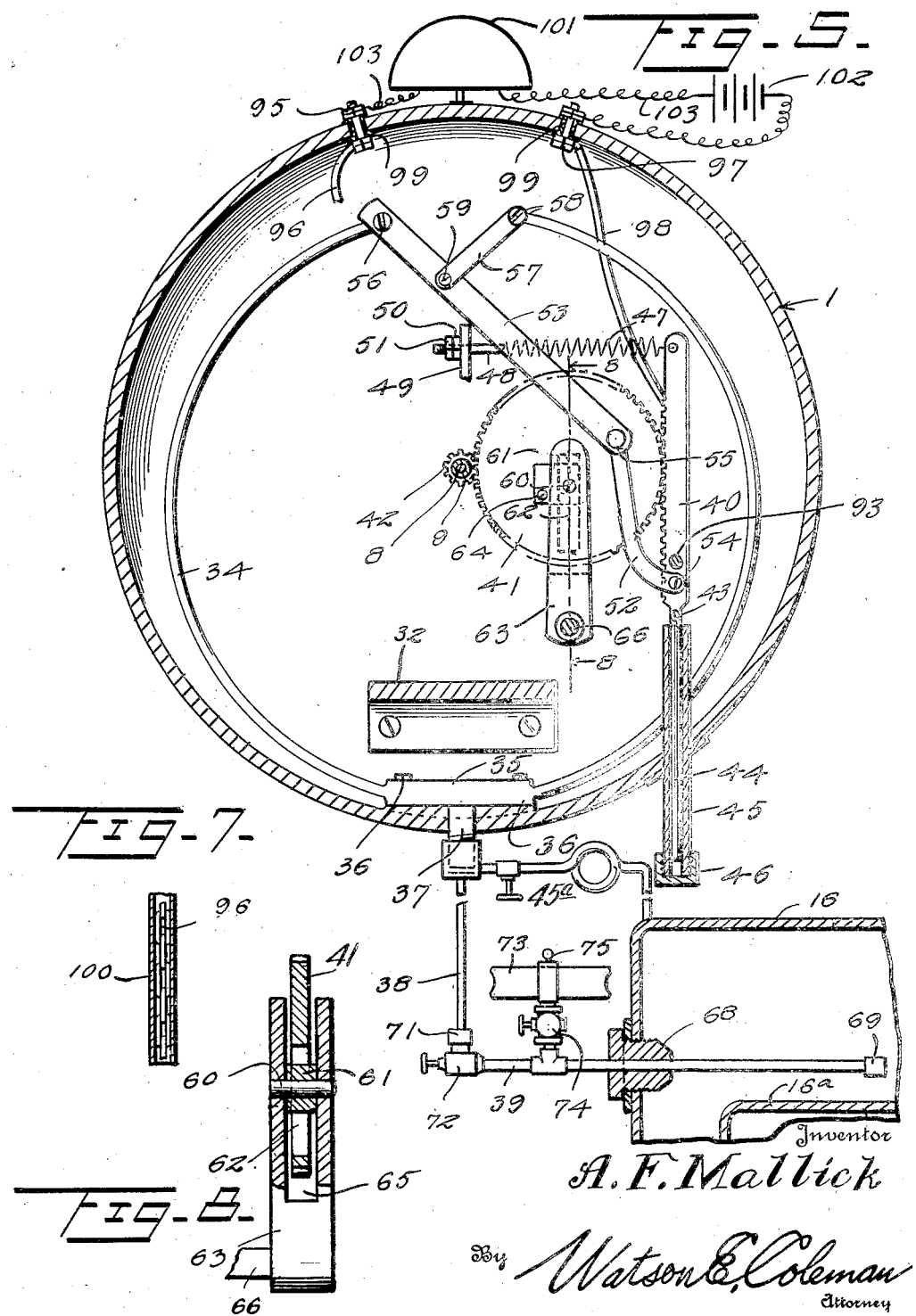

Patented Mar. 13, 1934

1,950,897

UNITED STATES PATENT OFFICE 1,950,897

BOILER ALARM GAUGE

Albert F. Mallick, Los Angeles, Calif., assignor of one-twelfth to James R. Lineburg, Los Angeles, Calif.

Application December 28, 1929, Serial No. 417,150

4 Claims. (Cl. 73—109)

This invention relates to improvements in the boiler alarm gauge forming the subject matter of my U. S. Patent No. 533,365, granted January 29, 1895, and embodying pointer adapted to respectively indicate the steam pressure and the degree of heat in the boiler, means for operating the pointers in unison as long as the boiler is in normal condition and for operating the pointers differentially when the boiler is in abnormal condition, an electrically operated audible alarm, and a switch in circuit with the alarm and adapted to be closed by said means during the operation of the pointers differentially thereby, said means including a toothed element connected by a rod and lever to a thermostat arranged within the boiler, and a rack bar connected by levers to a diaphragm subject to the steam pressure in the boiler.

The present invention has for one of its objects to improve and simplify the pointer operating means, and to attain this end comprehends the operation of the rack bars of said means through the medium of Bourdon tubes.

The present invention has for a further object to provide novel and simple means for insuring the movement of the pointers in unison as long as the boiler is in normal condition.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in front elevation of the boiler alarm gauge;

Figure 2 is a sectional view on an enlarged scale taken on the vertical plane indicated by the line 2—2 of Figure 1;

Figure 3 is a sectional view on an enlarged scale taken on the horizontal plane indicated by the line 3—3 of Figure 1;

Figure 4 is a vertical sectional view on an enlarged scale taken on a plane at right angles to the plane of Figures 2 and 3, illustrating the steam pointer operating mechanism of the gauge;

Figure 5 is a vertical sectional view on an enlarged scale taken on a plane parallel to and rearwardly of the plane of Figure 4, illustrating the heat pointer operating mechanism of the gauge and illustrating the manner in which the gauge is to be connected to a boiler;

Figure 6 is a diagrammatic view of the gauge alarm and the circuit control means therefor;

Figure 7 is a sectional view taken on a plane extending longitudinally through a portion of one of the conductors of the alarm circuit;

Figure 8 is a sectional view taken on the vertical plane indicated by the line 8—8 of Figure 5;

Figure 9 is a sectional view of the inner end of the oil or mercury tube of the gauge, and Figure 10 is a sectional view of the reservoir of the tube.

Referring in detail to the drawings, 1 designates the casing of the boiler alarm gauge. 2 designates the transparent front panel, and 3 the dial of the gauge. The dial 3 is graduated, as at 4, to represent pounds of steam pressure and sub-divisions thereof, and graduated, as at 5, to represent degrees of heat and sub-divisions thereof. Pointers 6 and 7 are supported one outward of the other for movement over the dial 3, the pointer 7 cooperating with the graduations 5 to indicate the degree of heat in the boiler and the pointer 6 cooperating with the graduations 4 to indicate the steam pressure in the boiler. The pointer 6 is fixed to the front end of a shaft 8, and the pointer 7 is fixed to the front end of a tubular shaft 9. The shaft 8 is journaled in a bearing 10 and in the shaft 9, and the shaft 9 is journaled in bearings 11.

A double expansion Bourdon tube 12 is fixed at its lower side to a stand 13 (see Figure 4) which is secured, as at 14, within and to the bottom of the casing 1 and is provided with a nipple 15 extending below the casing. A tube 15ª extending from the boiler 16 to the nipple 15, establishes communication between the Bourdon tube 12 and the steam space of the boiler.

A double toothed segment 17 is arranged within the casing 1 to the right of the shaft 9, and one end thereof meshes with a pinion 18 fixed to this shaft. The segment 17 is pivoted intermediate its ends, as at 19, to and within a gear frame 20, and it is connected by a lever 21 to one end of the tube 12. The lever 21 is pivotally connected at its lower end to the segment 17 to the right of the pivot 19, as at 22, and it is pivotally connected intermediate its ends, as at 23, to one end of the tube 12.

A link 24, connects the lever to the other end of the tube 12, and pivoted at one end, at 25, to the upper end of the lever and at the other end, at 26, to the tube. The pivots 19 and 22 are carried by a block 27 on which is mounted the segment 17 for adjustment in the direction of its length, the segment being secured in adjusted position by a screw 28.

The gear frame 20 comprises a front plate 29 and a rear plate 30 which are secured together in relatively spaced relation by posts 31. The gear frame 20 is secured to the front side of a bracket 32 by screws 33 which engage the rear plate 30.

A double expansion Bourdon tube 34 is arranged within the casing 1 rearwardly of the tube 12. The tube 34 is secured at its lower side to a stand 35 which is secured, as at 36, within and to the bottom of the casing 1. A nipple 37 extends downwardly from the stand 35, and is connected by a wire pipe 38 to a tube 39 which extends into the boiler 16 close to the crown sheet 16ᵃ thereof and which contains a high or low boiling point oil or mercury.

A vertical rack bar 40 is slidably arranged within the casing 1 to the right of the shaft 8 and rearwardly of the segment 17. The rack bar 40 meshes with an eccentric gear 41 which is arranged between it and a pinion 42 fixed to the shaft 8. The rack bar 40 has its lower end pivoted, as at 43, to the upper end of a vertical guide rod 44 which is slidably associated with a vertical guide tube 45 secured to the bottom of the casing 1 and its lower end closed by a cap 46.

The rack bar 40 is yieldingly maintained in engagement with the eccentric gear 41 by a spring 47 which is secured at one end to the upper end of the rack bar and at its other end to a bolt 48 which passes freely through the upper end of a post 49 secured to the gear frame 20. A nut 50, which is engaged with the bolt 48 and contacts with the post 49, provides means by which the tension of the spring 47 may be varied, and accidental movement of this nut is prevented by a lock nut 51.

The rack bar 40 is secured to one end of the tube 34 through the medium of a link 52 and a lever 53. The link 52 is pivoted at its lower end, as at 54, to the lower end of the rack bar 40, and is pivoted at its upper end, as at 55, to the lower end of the lever 53. The lever 53 is pivoted at its upper end, as at 56, to one end of the tube 34, and it is connected to the other end of the tube by a link 57, the link being pivotally connected, as at 58, to said other end of the tube, and as at 59, to the lever at a point intermediate the ends of the latter. The shaft 60 for the gear 41 is carried by a block 61 which is mounted in a radial slot 62 in the gear, and it has its ends journaled in the upper end of a standard 63. The slot 62 permits the gear 41 to be adjusted with respect to its shaft 60 so as to vary its eccentricity, and it is secured in adjusted position by a screw 64. The standard 63 is provided with a vertical slot 65 for the reception of the gear 41 and it is pivoted at its lower end as at 66, to the gear frame plates 29 and 30. The spring 47, in addition to holding the rack bar 40 in engagement with the gear 41, holds the gear in engagement with the pinion 42.

The oil or mercury tube 39 is of double strength and is carried by and extends through the washer plug 68 of the boiler 16. The inner end of the tube 39 is closed by a cap 69 and a check valve 70, both being employed to insure a liquid-tight closure for this end of the tube. The wire pipe 38 is connected by a coupling 71 to an angle valve 72 which is secured to the outer end of the tube to permit said end to be closed when the gauge is to be taken down. A reservoir 73 for the oil or mercury, is connected to the tube 39 by a valve 74 and is provided with a needle valve 75, the valve 75 regulating the flow of the oil or mercury from the reservoir to the tube, and the valve 74 permits the supply of oil from the reservoir to the tube to be cut off when the tube contains the correct amount.

A vertical contact tube 76, shown in detail in Figure 6, is slidably arranged between the plates of the gear frame 20 to the right of the double segment 17, and is provided with a rack bar 77 which meshes with the right hand end of the segment. The segment 17 is provided on its left hand end with a weight 17ᵃ to counterbalance the tube 76. The tube 76 is guided in its movements by a rod 78 which extends upwardly therefrom and is slidably associated with a vertical guide 79 secured, as at 80, to the top of the casing 1. The tube 76 is preferably made of aluminum, and is provided in its upper and lower ends with plugs 81 and 82, respectively, made of insulating material. The lower end of the guide rod 78 is secured to the plug 81, and is insulated thereby from the tube 76. The upper surface of the plug 82 is dished, and a dished partition 83, made of insulating material is secured within the contact tube 76 a short distance above the plug 82. The plug 82 and the partition 83 are provided with axial openings 84 and 85, respectively.

Contact balls 86 rest upon the plug 82 normally out of contact with the tube 76, and contact balls 87 rest upon the partition 83 normally out of contact with the tube. A contact strip 88 is arranged axially within the tube 76 above the contact balls 87, and is secured at its upper end, as at 89, to the tube, the lower end of the strip being bent laterally, as at 90, to permit the upper end of the contact rod 91 to move into electrical contact therewith. The rod 91 has its upper end arranged in the opening 84 of the plug 82, and is secured at its lower end, as at 92, to an arm 93. The arm 93 is secured to the lower end of the rack bar 40 and extends forwardly therefrom to a point below and in alinement with the tube 76. The arm 93 is insulated from the rack bar 40 by a bushing 94.

The casing 1 has secured to the top thereof a binding post 95 which is connected to the contact tube 76 by a conductor 96, and a binding post 97 which is connected to the arm 93 by a conductor 98. The binding posts 95 and 97 are insulated from the casing 1 by bushings 99. The conductors 96 and 98 are made up of links freely movable with respect to each other so as not to interfere with the movements of the rack 40 and the tube 76, and the conductors are arranged within freely flexible tubes 100 of insulating material, as shown in Figure 7. An electric bell 101 is secured to the top of the casing 1, and is connected to the binding posts 95 and 97 and a source of current 102 by conductors 103. If desired, an electric buzzer, electric horn, electric whistle or the like may be used in place of the bell 101.

The expansion and contraction of the Bourdon tube 12, as the result of fluctuations of the steam pressure in the boiler, will move the pointer 7 over the dial 3, the pointer cooperating with the graduations 4 to indicate the steam pressure. The expansion and contraction of the Bourdon tube 34, as the result of the fluctuations in the temperature in the boiler will move the pointer 6 over the dial 3, the pointer cooperating with the graduations 5 to indicate the temperature in the boiler. Under normal condition within the boiler, which condition exists when the boiler contains sufficient water to cover the parts thereof that are exposed to heat and when the water contains a normal amount of air, the pointers 6 and 7 move in unison over the dial 3 and, at the same time, the rack bar 40 and the contact tube 76 move in unison. This movement of these parts results from the employment of the gear 41 which, due to its eccentric mounting, compensates for the variations in the steam pressure and the temperature in the boiler which take place under normal boiler conditions. Any adjustment necessary to bring about the movement of these parts in unison under normal boiler conditions may be accomplished by adjusting the bearing gear 41 upwardly and downwardly on the block 61.

Under normal boiler conditions, the rack bar 40 and contact tube 76 will not move relatively to each other but will occupy such relative vertical positions as to maintain the upper end of the contact bar 91 within the opening 84 of the insulating plug 82 and below the contact balls 86, with the result that the alarm apparatus will not be sounded under normal boiler conditions.

Under abnormal boiler conditions, which exist when the boiler does not contain sufficient water to cover the parts exposed to heat or when the air is almost completely boiled out of the water, the temperature increases more rapidly than the pressure, with the result that the pointers 6 and 7 and the rack 40 and the contact tube 76 move differentially. Under abnormal boiler conditions, the rack bar 40 and the contact tube 76 will move relatively in opposite directions with the result that the contact bar 91 will be first moved into engagement with the contact balls 86, then into engagement with the contact balls 87 and thereafter into engagement with the contact strip 88. The upper end of the contact rod 91 is pointed to facilitate its passage through and beyond the contact balls 86 and 87 and said end cooperates with the bent lower end 90 of the contact strip 88 so as to facilitate the engagement of the rod and strip. The contact rod 91 is provided below its pointed upper end with an insulating sleeve 91a so as to permit said end only to electrically contact with the balls 86 and 87 and the strip 88. When the upper end of the contact rod 91 enters between the contact balls 86, the latter will be moved into engagement with the contact tube 76, with the result that the alarm apparatus will be sounded for a short period. When the upper end of the contact rod 91 enters between the balls 87, the latter will be moved into engagement with the contact tube 76, with the result that the alarm apparatus will be again sounded for a short period. When the upper end of the contact rod 91 engages the contact strip 88, the alarm apparatus will be sounded for a long period.

The insulating sleeve 91a breaks the electrical engagement between the contact rod 91 and contact balls 86 when the contact rod is in electrical engagement with the balls 87, and it breaks the electrical engagement between the contact rod 91 and the balls 86 and 87 when the contact rod is in engagement with the contact strip 88, thus insuring the sounding of the alarm apparatus for two short periods and one long period.

It should be apparent from the foregoing description, taken in connection with the accompanying drawings, that I have provided a gauge which will enable the engineer to quickly ascertain the exact temperature and the exact steam pressure in a steam boiler and which, when the temperature of the boiler increases to an abnormally high degree will operate an audible signalling apparatus. It should be further apparent that the use of the gauge will reduce to a minimum the possibility of boiler explosions which are due mainly or solely to the temperature of the boiler increasing to an abnormally high degree. The gauge will also cause the operation of the audible signalling apparatus when the crown sheet is bulged in whistle valve, when safety valve blows out, or when the steam dome or any other part of the boiler over the water line is opened as the result of a fracture or the like, due to the fact that any of such boiler conditions results in the reduction of the pressure in the boiler and the consequent sudden increase in steam.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A gauge of the character set forth, including a casing having a dial, a shaft journaled in the casing and provided with a pointer movable over the dial, a Bourdon tube in the casing, a pinion fixed to the shaft, a block pivoted in the casing at one side of the shaft, a segment gear engaging the pinion and mounted on the block for adjustment with relation to the pinion, means for securing the segment gear in adjusted position, a lever pivoted between its ends to one end of the tube and pivoted at one end to the block, and a link connected to the other end of the tube and to the other end of the lever.

2. A gauge of the character set forth, including a casing having a dial, a shaft journaled in the casing and provided with a pointer movable over the dial, a Bourdon tube in the casing, a pinion fixed to the shaft, a block pivoted in the casing at one side of the shaft, an eccentric gear engaging the pinion and mounted on the block for adjustment with relation to the pinion, means for securing the eccentric gear in adjusted position, a slidably and pivotally mounted rack bar engaging the eccentric gear, a spring normally urging the rack bar in the direction of the eccentric gear, a lever pivoted at one end to one end of the tube, a link connecting the other end of the lever to the rack bar, and a link connected to the other end of the tube and to the lever at a point between the ends of the latter.

3. A boiler alarm gauge, comprising a casing having a dial, concentric shafts journaled in the casing and carrying pointers movable over the dial, pressure and temperature Bourdon tubes in the casing, a tube adapted to establish communication between the pressure Bourdon tube and the steam space of the boiler, a tube adapted to contain liquid communicating with the temperature Bourdon tube and adapted to be arranged in the boiler close to the crown sheet thereof, a pinion fixed to one of the shafts, a block pivoted in the casing, a segment having one end engaged with the pinion and mounted on the block for adjustment with relation to the pinion, means for securing the segment in adjusted position, a lever pivoted between its ends to one end of the pressure Bourdon tube and at one end to the block, a link pivoted to the other end of the lever and to the other end of the pressure Bourdon tube, a pinion fixed to the other of said shafts, a block pivoted in the casing, an eccentric gear meshing with said second pinion and mounted on said second block for adjustment with relation to said second pinion, a rack bar pivotally and slidably mounted in the casing and meshing with the eccentric gear, a spring urging the rack bar in the direction of the eccentric gear, a lever pivoted at one end to one end of the temperature Bourdon tube, a link connecting the other end of the lever to the rack bar, and a link pivoted to the other end of the temperature Bourdon tube and to said last lever at a point between the ends of the lever.

4. A boiler alarm gauge including a casing having a dial, concentric shafts journaled in the casing and each carrying a pointer movable over the dial, pressure and temperature actuated Bourdon tubes disposed within the casing, each supported at its middle and having its ends free, means connected to the free ends of one Bourdon tube whereby one of said shafts may be rotated upon the expansion and contraction of the Bourdon tube, means connected to the free ends of the other Bourdon tube whereby the other shaft may be rotated upon expansion or contraction of the free ends of the second named Bourdon tube, a tubular connection leading from the middle of one Bourdon tube to the steam space of a boiler whereby the pressure of steam within the boiler may be indicated by movement of the corresponding Bourdon tube, and a tubular connection leading from the middle of the other Bourdon tube and leading into the boiler close to the crown sheet of the boiler, the tubular connection being closed and containing liquid affected by temperature.

ALBERT F. MALLICK.